United States Patent
Ivanco

(10) Patent No.: US 10,619,699 B2
(45) Date of Patent: Apr. 14, 2020

(54) SELF-TURNING COMPACT VIBRATION DAMPER

(71) Applicant: U.S.A. AS REPRESENTED BY THE ADMINISTRATOR OF NASA, Washington, DC (US)

(72) Inventor: Thomas G. Ivanco, Yorktown, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 43 days.

(21) Appl. No.: 15/959,962

(22) Filed: Apr. 23, 2018

(65) Prior Publication Data

US 2018/0306268 A1 Oct. 25, 2018

Related U.S. Application Data

(60) Provisional application No. 62/489,773, filed on Apr. 25, 2017, provisional application No. 62/488,359, filed on Apr. 21, 2017.

(51) Int. Cl.

| F16F 15/02 | (2006.01) |
|---|---|
| F16F 15/31 | (2006.01) |
| F16F 15/315 | (2006.01) |
| F16F 15/28 | (2006.01) |
| E04B 1/98 | (2006.01) |
| F16F 13/00 | (2006.01) |
| F16H 19/04 | (2006.01) |

(52) U.S. Cl.
CPC ............ *F16F 15/022* (2013.01); *E04B 1/985* (2013.01); *F16F 13/005* (2013.01); *F16F 15/02* (2013.01); *F16F 15/28* (2013.01); *F16F 15/31* (2013.01); *F16F 15/315* (2013.01); *F16H 19/04* (2013.01); *F16F 2230/0011* (2013.01)

(58) Field of Classification Search
CPC ........ F16F 15/02; F16F 15/022; F16F 15/023; F16F 15/0235; F16F 15/027; F16F 15/0275; F16F 15/04; F16F 15/06; F16F 15/067; F16F 15/28; F16F 15/31; F16F 15/315; F16F 15/3153; F16F 13/005; F16F 13/007

See application file for complete search history.

(56) References Cited

U.S. PATENT DOCUMENTS

| 3,491,857 A | 1/1970 | Reed, III |
|---|---|---|
| 3,568,805 A | 3/1971 | Reed, III |
| 6,019,056 A | 2/2000 | Maeda et al. |
| 7,862,056 B2 | 1/2011 | Zeid et al. |

(Continued)

*Primary Examiner* — Thomas J Williams
(74) *Attorney, Agent, or Firm* — Robin W. Edwards; Helen M. Galus

(57) ABSTRACT

Systems, methods, and devices of the various embodiments provide a compact vibration damper configured to be remotely-tunable and/or self-tuning. In various embodiments, a flywheel may be coupled to a shaft that spins a rotary damper. A linear actuator may operate a scissor assembly that moves the flywheel thereby changing the mass moment of inertia of the spinning flywheel without changing the actual mass of the flywheel. The linear actuator may move the scissor assembly and flywheel to tune the compact vibration damper. In additional embodiments, opposing rotary springs may be coupled to the shaft that spins the rotary damper.

20 Claims, 4 Drawing Sheets

(56) References Cited

U.S. PATENT DOCUMENTS 8,672,107 B2   3/2014   Ivanco
2015/0345134 A1*  12/2015   Takahashi ............... F16F 9/535
                                                       52/167.2

* cited by examiner

SELF-TURNING COMPACT VIBRATION DAMPER

CROSS-REFERENCE TO RELATED PATENT APPLICATIONS

This patent application claims the benefit of and priority to U.S. Provisional Patent Application No. 62/488,359 filed on Apr. 21, 2017 and U.S. Provisional Patent Application No. 62/489,773 filed on Apr. 25, 2017, both entitled "Self-Tuning Compact Vibration Damper," the entire contents of both hereby incorporated by reference.

STATEMENT REGARDING FEDERALLY SPONSORED RESEARCH OR DEVELOPMENT

The invention described herein was made by an employee of the United States Government and may be manufactured and used by or for the Government of the United States of America for governmental purposes without the payment of any royalties thereon or therefore.

BACKGROUND OF THE INVENTION

Structural vibrations frequently need to be suppressed or "damped" to prevent damage to a structure. To accomplish this, one standard practice is to use a tuned damper. Tuned dampers are devices that are intentionally designed to have the same natural frequency as the structure they are damping. During vibration, the motion of the tuned damper dissipates energy and reduces primary structural vibration. The standard practice typically uses elastomerically-suspended moving masses or linear dampers that consist of a piston housed in a fluid-filled cylinder that is attached to a moving mass. Energy is dissipated by motion of the fluid in the cylinder or through strain of the elastomeric material. The magnitude of the energy that can be dissipated by a tuned damper is proportional to the magnitude of the mass or the square of the distance that the moving mass travels. In either of these standard practices, the range of motion of the moving mass is restricted. For example, if the damper's piston has to be capable of 2 inches of movement in either direction, the internal length of the fluid-filled cylinder would have to be at least 4 inches while the connecting rod must also be at least 4 inches to span the piston's travel. Additionally, the rod connections, cylinder walls, and piston all have thickness. This means that the overall length of the linear damper is about 9 inches to achieve +/−2 inches of damping movement. Unfortunately, not all applications have the space to accommodate the size requirements of a linear damper or can tolerate the weight penalty of a smaller device.

In the case of masses suspended using elastomeric materials (i.e., those whose material strain exhibits a viscous force), the allowable range of motion is severely restricted by the allowable strain of the elastomeric material.

BRIEF SUMMARY OF THE INVENTION

The systems, methods, and devices of the various embodiments provide a compact vibration damper configured to be remotely-tunable and/or self-tuning. Various embodiments may provide a vibration damper including a rigid base with a mass coupled to the base for linear movement thereon. A converter, coupled to the mass, may convert the linear movement to a corresponding rotational movement. A rotary damper coupled to the converter damps the rotational movement. Rotary springs may be coupled to the shaft that spins the rotary damper thereby opposing linear movement of the mass. A flywheel may be coupled to the same shaft that spins the rotary damper. Rotational motion of the flywheel greatly increases the kinetic energy such that the effectiveness of the mass is much greater than linear motion alone. A linear actuator may operate a weight actuator assembly, such as a scissor assembly, pivot arm, jackscrew, etc., that moves the flywheel thereby changing the mass moment of inertia of the spinning flywheel without changing the actual mass of the flywheel. The linear actuator may move the weight actuator assembly and flywheel to tune the compact vibration damper. In additional embodiments that may or may not include a rotary spring, a first spring coupled to the mass may compress in response to the linear movement along a first direction. A second spring coupled to the mass may compress in response to the linear movement along a second direction that is opposite to the first direction.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE INVENTION

Figure 1:
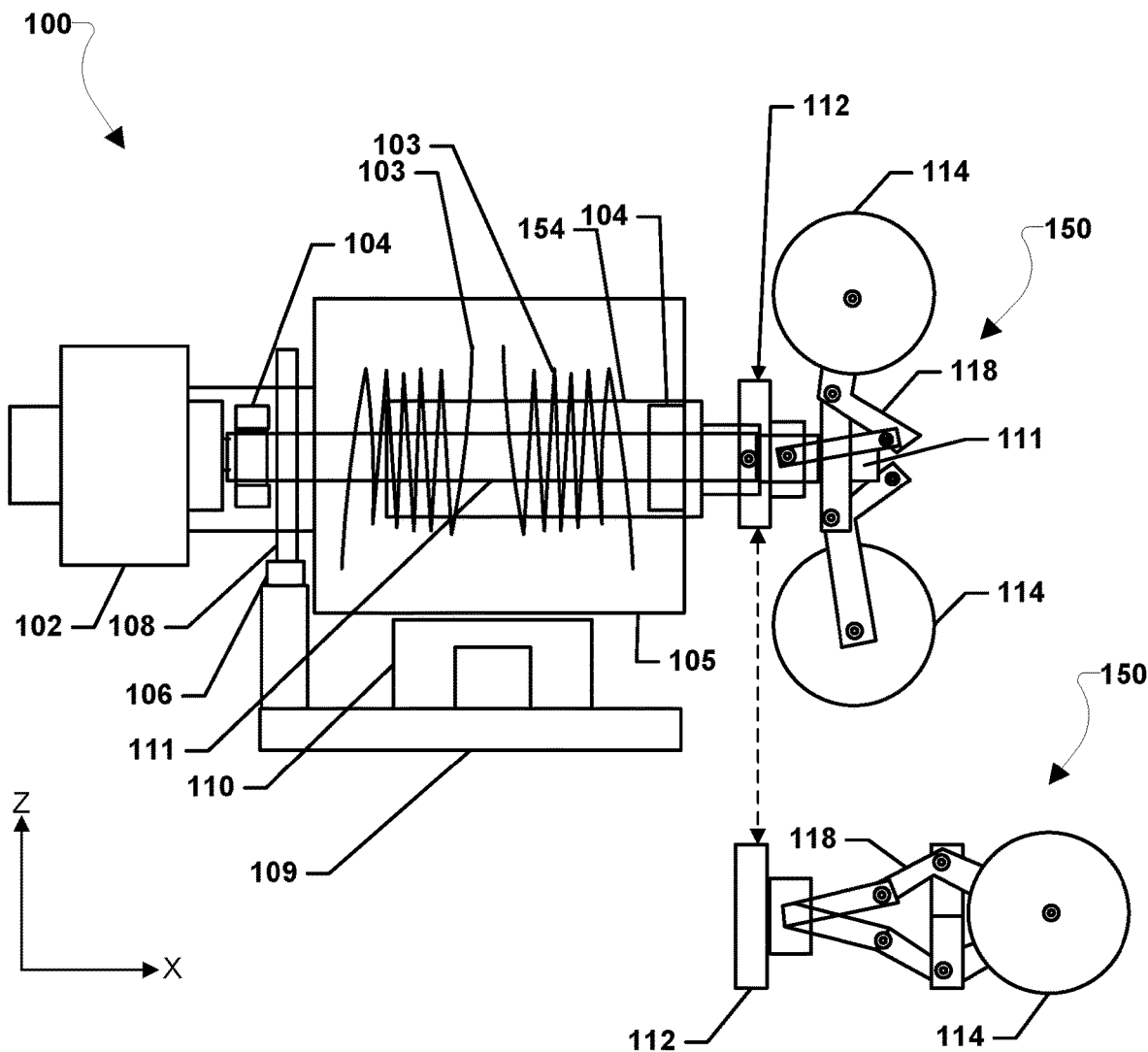
FIG. 1 is a schematic block diagram of a side view of an example vibration damper according to various embodiments.

For purposes of description herein, it is to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The word "exemplary" is used herein to mean "serving as an example, instance, or illustration." Any implementation described herein as "exemplary" is not necessarily to be construed as preferred or advantageous over other implementations.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

A tuned-damper requires the natural frequency of the damper mass to be tuned to the frequency of a target system that a user is trying to suppress. Since the natural frequency of the tuned damper is in-sync with the target system, the damper mass will oscillate violently. That oscillation is then damped by an on-board damper. The energy dissipated by the damper and by internal friction reduces the dynamic oscillation of the target system.

Passive compact vibration dampers have been shown to be very effective and likely to offer the best damping performance for a given weight while also outperforming active damping devices. One such passive compact vibration damper design is illustrated in U.S. Pat. No. 8,672,107 (incorporated by reference herein in its entirety for all purposes). The vibration damper illustrated in U.S. Pat. No. 8,672,107 utilized a rotary damper and compact rack-and-pinion design. The vibration damper illustrated in U.S. Pat. No. 8,672,107 enabled a much greater range of motion of the moving mass and much greater effectiveness (approaching a factor of 10) for the same mass and size of conventional devices at the time of the filing of U.S. Pat. No. 8,672,107. While effective, the vibration damper illustrated in U.S. Pat. No. 8,672,107 is difficult to incorporate into a new usage because of the engineering and field-tuning required to make that damper optimized for a particular application. Accordingly, there is a need for a passive compact vibration damper to be self-tuning and/or remotely adjustable which previous designs do not support.

The systems, methods, and devices of the various embodiments provide a compact vibration damper configured to be remotely-tunable and/or self-tuning. The various embodiments enable remotely adjusting the natural frequency of a tuned damper device. In various embodiments, the linear motion of a slide mass is combined with the rotational motion of a flywheel coupled to the same shaft that spins the rotary damper. The flywheel may include a large percentage (e.g., 50% or greater) of the total mass of the sliding component. A linear actuator attached to the sliding component may operate weight actuator, such as a scissor assembly, pivot arm actuated by a gear, a jackscrew, or other device, that may move the mass of the rotating flywheel inboard or outboard from the center of rotation thereby changing the mass moment of inertia of the flywheel. Changing the mass moment of inertia of the flywheel that is coupled to the linear motion of the slider will then alter the natural frequency of the slider (i.e., the tuned frequency of the damper). Once the natural frequency is tuned, the linear actuator may hold its position and the devices of the various embodiments may not require external power unless a new adjustment is required. In this manner, the self-adjusting tuned dampers of the various embodiments may require far less power (and less maintenance) than active dampers that require actuators to move weights to oppose vibration. Additionally, the rotational energy of the flywheel increases the effective mass of the linear slider enabling even greater effectiveness for the same weight than that of the damper illustrated in U.S. Pat. No. 8,672,107.

Various embodiments may provide a vibration damper that may use opposing rotary springs mounted to the rotational shaft. At the neutral point, both springs may be nearly relaxed with very little pre-load. As the slider mass moves in one direction, a flange on the shaft, or notch within the shaft, may compress the rotary spring (or other type springs) that oppose motion. Various mounting configurations may offer a linear spring rate with linear deflection. A gear ratio may be used in the various embodiments such that the magnitude of rotation compared to linear motion may be adjusted. As a result, the various embodiments may provide a very compact damper with nearly all mass of the damper device being a part of the moving mass. This will maximize the effectiveness of the damper even further for a given total mass.

Figure 2:
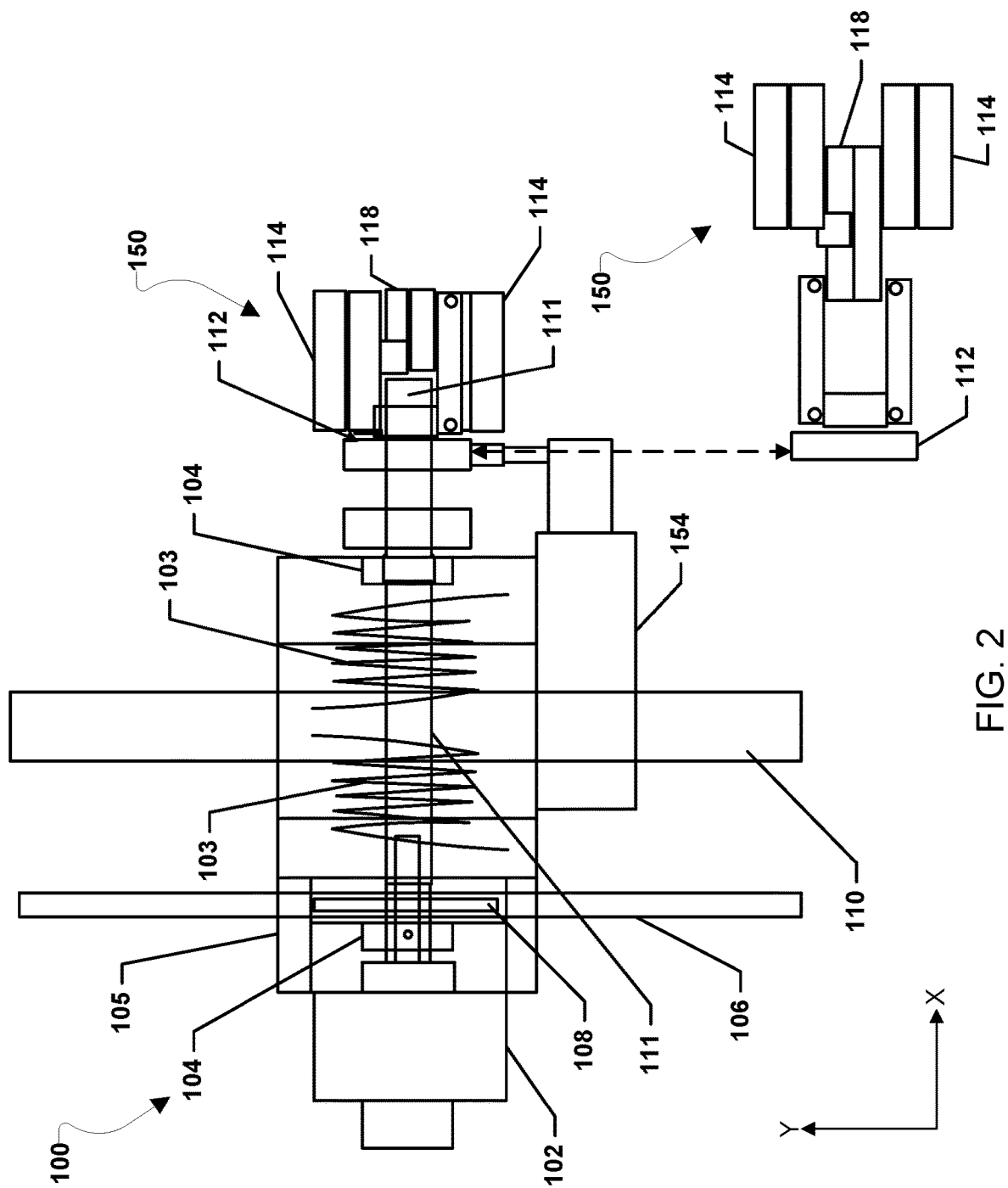
FIG. 2 is a schematic block diagram of a top view of the example vibration damper of FIG. 1.

FIG. 1 is a schematic block diagram of a side view along the y-axis of an example vibration damper 100 according to various embodiments. FIG. 2 is a schematic block diagram of a top view along the z-axis of the example vibration damper 100 of FIG. 1. With reference to FIGS. 1 and 2, in general, vibration damper 100 may be coupled to a structure (not shown). When that structure vibrates, vibration damper 100 operates to quickly damp out such vibrations. The vibration damper 100 may be applied to any type and/or size of structure.

The vibration damper 100 may include a base 109 that may be coupled to a structure. The base 109 may be constructed from a rigid material (e.g., metal, composite, etc.) such that vibrations in the structure are efficiently coupled to base 109.

A slider assembly 110 may be coupled to the base 109. The slider assembly 110 may be any type slider assembly that may enable linear motion. For example, the slider assembly 110 may be an AccuMini (10 series) linear ball guide by Danaher Motion. A housing 105 may be coupled to the slider assembly 110. The housing 105 may support various elements of the vibration damper 100. The slider assembly 110 may be configured to enable the housing 105 to slide back and forth along the y-axis when the vibration damper 100 vibrates with the structure. The housing 105 may include a shaft 111 freely passing through a passage defined in the housing 105 and extending along the x-axis. The shaft 111 may be supported in the housing 105 by bearings 104 at opposite ends of the housing 105. The bearings may allow the rotation of the shaft 111 around the x-axis. A first compression spring 103 is disposed about the shaft 111 on one side of housing 105 and a second compression spring 103 is disposed about the shaft 111 on an opposite side of the housing 111. The springs 103 may be selected to provide a desired spring rate when the vibration damper 100 is tuned for a particular application. The springs 103 may compress and expand along the x-axis. The springs 103 may be any type springs, such as compression springs or torsion springs. As examples, the springs 103 may be AC5479 torsion springs by Lee Spring, or ST627 clock springs by All-Rite Spring Company.

The housing 105 also supports a rotary (fluid-filled or viscous) damper 102 such that rotary damper 102 moves in correspondence with the linear motion of housing 105 while also damping out such linear motion. The rotary damper 102 may be any type rotary damper configured to dampen out linear motion of the housing 105. For example, the rotary damper may be a rotary damper by EFDYN/Kinetrol. The rotary damper 102 may be coupled to the shaft 111. A spur gear 108 may be coupled to the shaft 111 and a rack gear 106 may be coupled to the base 109 such that the teeth of the rack gear 106 engage with the teeth of the spur gear 108. The rack gear 106 may be any type rack gear, such as a rack gear by Boston Gear. The spur gear 108 may be any type spur gear, such as a spur gear by Boston Gear. In operation, when the housing 105 experiences linear motion in either direction along the y-axis (e.g., due to vibrations in the structure and sliding of the housing 105 with the slider assembly 110), spur gear 108 may rotate around the x-axis via its engagement with rack gear 106. In this manner, the combination of the spur gear 108 and rack gear 106 may operate as a converter coupled to the shaft 111 to translate linear motion into rotational motion. The corresponding rotation of shaft 111 is transferred to the rotor of rotary damper 102 whereby such rotational motion is dampened.

The vibration damper 100 may also include an adjustable ballast weight assembly coupled to the shaft 111 at an opposite end from the rotary damper 102. As shown in FIGS. 1 and 2, in one embodiment, the adjustable ballast weight assembly may be a ballast weight scissor assembly 150 coupled to the shaft 111 at an opposite end from the rotary damper 102. In other embodiments, the adjustable ballast weight assembly may be any other type assembly that may be configured to change the mass moment of inertia by moving the mass towards or away from a center of rotation of the shaft 111. While a ballast weight scissor assembly 150 is shown in FIGS. 1 and 2, one of ordinary skill in the art may substitute the ballast weight scissor assembly 150 for other type assemblies in the various embodiments, including a pivoting arm actuated by a gear, weights forced outboard along a flywheel using a jackscrew, or any other linear actuator in the rotating frame. In embodiments in which the adjustable ballast weight assembly may be the ballast weight scissor assembly 150, the ballast weight scissor assembly 150 may rotate with the shaft 111 around the x-axis. In this manner, the ballast weight scissor assembly 150 may be a flywheel attached to the end of the shaft 111 and the flywheel formed by the ballast weight scissor assembly 150 may rotate with the shaft 111 and the rotary damper 102 as they are rotated by the spur gear 108 moving along the rack gear 106. The ballast weight scissor assembly 150 may include a set of scissor arms 118 each having one or more adjustable ballast weights 114 at one end. The ballast weight scissor assembly 150 may include a swashplate 112 with impregnated bushings allowing sliding motion along shaft 111. For example, the swashplate may be an R/C helicopter tail-rotor pitch change assembly that comprises of a rotating frame that may attach to the scissor arms 118 opposite of the ballast weights 114. The swashplate may also include a non-rotating frame that connects to the actuator 154. The rotating and non-rotating frames of the swashplate 112 may be coupled by a rotational bearing such that one frame may rotate with respect to the other, but linear force is transmitted along the shaft x-axis. The adjustable ballast weights 114 may be interchangeable such that different size weights may be added in different applications. The swashplate 112 may be configured to be controlled by an actuator 154 coupled to the swashplate 112 and anchored to the base 105. For example, the actuator 154 may be configured to extend and retract along the x-axis and connect to the non-rotating frame of the swashplate 112. The actuator 154 may be any type actuator configured to control the movement of the swashplate 112, such as a linear actuator by Actuonix. The movement of the actuator 154 and resulting movement of the swashplate 112 may cause the scissor arms 118 to extend or retract the ballast weights 114. FIGS. 1 and 2 each show the ballast weight scissor assembly 150 in a fully extended position (i.e., maximum moment of inertia) attached to the vibration damper 100 and an exploded diagram portion of just the ballast weight scissor assembly 150 in the fully retracted position (i.e., minimum moment of inertia) below the vibration damper 100. The movement of the adjustable ballast weights 114 may move the mass of the rotating flywheel (i.e., the ballast weight scissor assembly 150) towards or away from the center of rotation of shaft 111 thereby changing the mass moment of inertia of the flywheel (i.e., the ballast weight scissor assembly 150). Changing the mass moment of inertia of the flywheel (i.e., the ballast weight scissor assembly 150) that is coupled to the linear motion of the slider 110 will then alter the natural frequency of the slider assembly restrained by 110 and housed in 105 (i.e., the tuned frequency of the vibration damper 100). The movement of the adjustable ballast weights 114 may enable changing the mass moment of inertia without changing the actual mass of the flywheel. In various embodiments, electrical signals or other inputs may be sent to the actuator 154 to control the operation of the actuator 154, thereby tuning the vibration damper 100. As discussed above, in other various embodiments, weights may be extended or retracted in various manners, such as the use of a cam to rotate swing arms, or the use of jackscrew on the flywheel assembly, and moving the flywheels mass towards or away from the center of rotation may be accomplished in any manner.

Once the natural frequency is tuned, the linear actuator 154 may hold its position and the vibration damper 100 may not require external power unless a new adjustment is required. In this manner, the vibration damper 100 may require far less power (and less maintenance) than active dampers that require actuators to move weights to oppose vibration.

Figure 3:
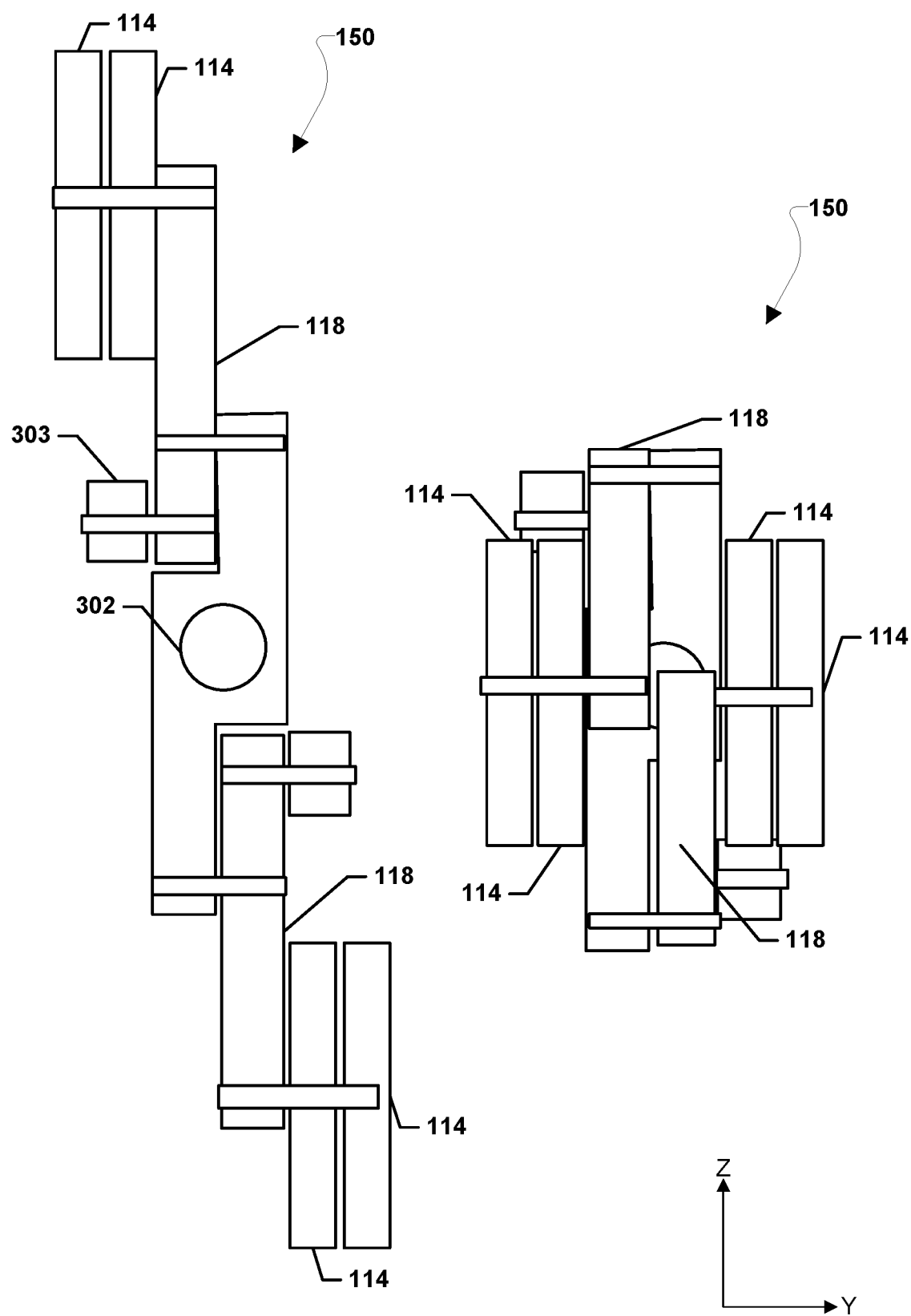
FIG. 3 is a schematic block diagram of a close up of the ballast weight scissor assembly of FIG. 1 according to various embodiments.

FIG. 3 is a schematic block diagram of a close up of the ballast weight scissor assembly 150 in a fully extended configuration (left side view of FIG. 3) and a fully retracted configuration (right side view of FIG. 3) viewed along the x-axis. With reference to FIGS. 1-3, the ballast weight scissor assembly 150 may include the dog leg scissor assembly 118 that may extend and retract the adjustable ballast weights 114. Additionally, pitch links 303 to the swash plate 112 and a yoke hole 302 for the shaft 111 may be included in the ballast weight scissor assembly 150.

Figure 4:
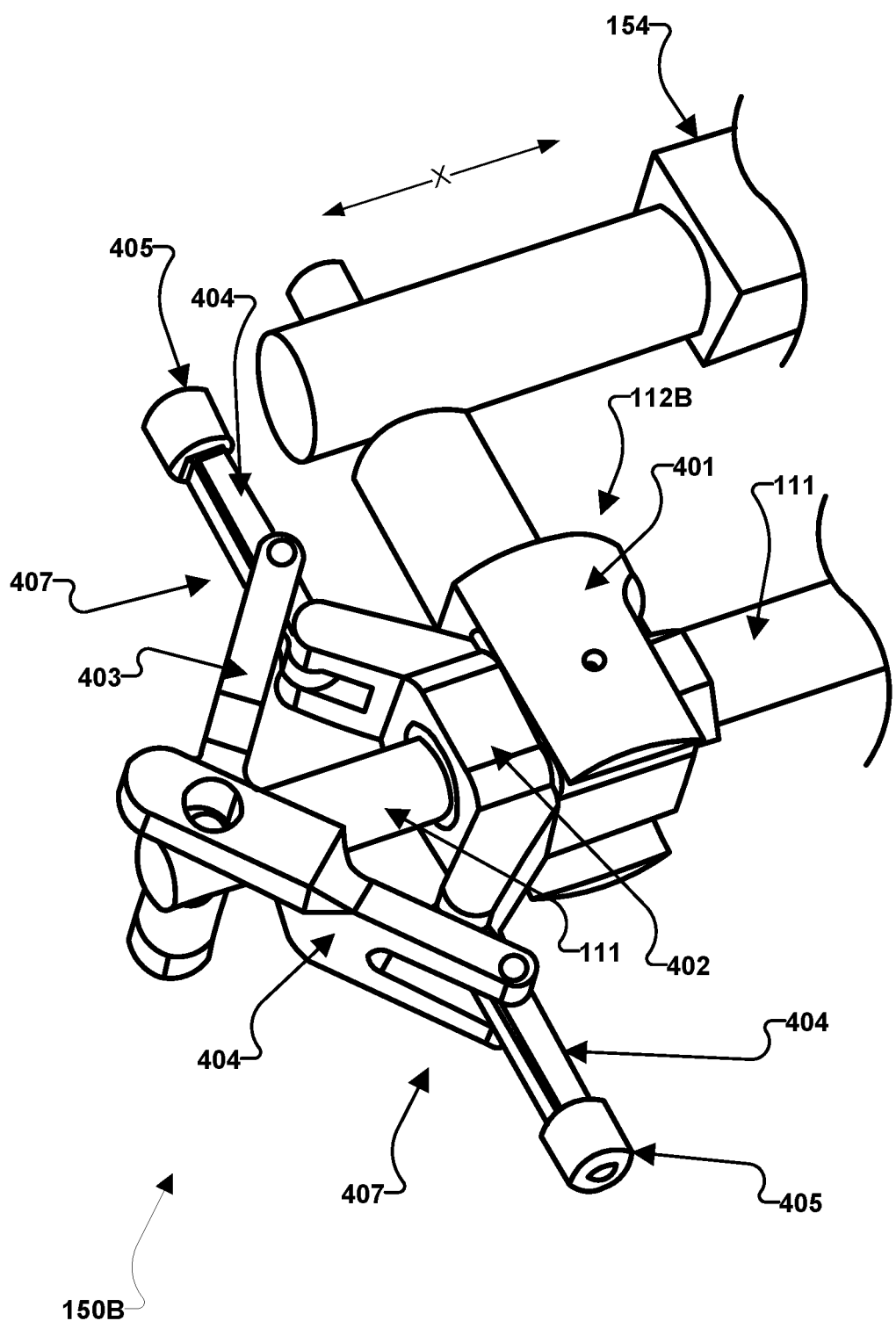
FIG. 4 is a schematic block diagram of a close up of another embodiment ballast weight scissor assembly.

FIG. 4 is a schematic block diagram of a close up of another embodiment ballast weight scissor assembly 150B mounted on shaft 111. The ballast weight scissor assembly 150B may be similar to ballast weight scissor assembly 150 illustrated in FIGS. 1-3 and may be substituted for ballast weight scissor assembly 150 in the various embodiments. With reference to FIGS. 1-4, the ballast weight scissor assembly 150B may include a swashplate 112B with a non-rotating frame portion 401 and a rotating frame portion 402. The swashplate 112B may include impregnated bushings allowing sliding motion along shaft 111 along the x-axis. For example, the swashplate 112B may be an R/C helicopter tail-rotor pitch change assembly that with the rotating frame portion 402 attaching to a pair of scissor arms 407. Each scissor arm 407 may include a weight supporting arm 404 rotationally connected to the rotating frame portion 402 at one end and an extension arm 403 rotationally connected to the shaft 111 at one end and rotationally connected to the weight supporting arm 404 at another end. Ballast weights (not shown) may be connected to the support arm ends 405 opposite the end connected to the rotating frame portion 402. The non-rotating frame portion 401 of the swashplate 112B may connect to the actuator 154. The rotating frame portion 402 and non-rotating frame portion 401 of the swashplate 112B may be coupled by a rotational bearing such that one frame may rotate around the x-axis with respect to the other, but linear force is transmitted along the shaft 111 x-axis. The movement of the actuator 154 and resulting movement of the swashplate 112B may cause the scissor arms 407 to extend or retract the ballast weights attached to the arm ends 405. The movement of the ballast weights attached to the support arm ends 405 may move the mass of the rotating flywheel (i.e., the ballast weight scissor assembly 150B) towards or away from the center of rotation of shaft 111 thereby changing the mass moment of inertia of the flywheel (i.e., the ballast weight scissor assembly 150B).

The movement of the ballast weights attached to support arm ends 405 may enable changing the mass moment of inertia without changing the actual mass of the flywheel (i.e., the ballast weight scissor assembly 150B). In this example embodiment, support arm ends 405 are threaded allowing removal and adjustability of ballast weights mounted by a socket screw. Alternatively, other coupling mechanisms, such as clips, snaps, etc., may be used with the support arm ends 405 to allow removal and adjustability of ballast weights.

While FIGS. 1-4 illustrate ballast weight scissor assemblies 150 and 150B having multiple masses moved to change the mass moment of inertia, other embodiments may only use a single mass, such as a single mass on a single pivoting arm. For example, only one arm of the dog leg scissor assembly 118 may be used with only a single mass attached thereto. This single arm and single mass may act as the adjustable ballast weight assembly to change the mass moment of inertia.

In various embodiments the vibration damper 100 that may use opposing rotary springs mounted to the rotational shaft 111. At the neutral point, both springs may be nearly relaxed with very little pre-load. As the slider assembly 110 moves in one direction, a flange on the shaft 111 may compress the rotary spring that opposes motion in that direction. This offers a liner spring rate with deflection provided that the full-throw of the slider assembly 110 results in less than one full revolution of the rotating shaft 111. A gear ratio of the rack gear 106 and spur gear 108 may be used in the various embodiments such that the full-throw of the slider assembly 110 results in less than one full revolution of the rotating shaft 111. In another embodiment, a clock spring 103 may be coupled to the shaft 111 through a slot in the shaft. A clock spring is capable of rotation in either direction and a single spring can provide resistance. In an extension of this embodiment, a series of clock springs can be manufactured such that adjusting the spring rate, and large adjustment of the natural frequency, can be achieved by adding or removing additional clock springs 103. Gear ratios of the rack gear 106 and spur gear 108 may be used such that the maximum rotational limit of the chosen clock spring is not exceeded.

A remotely-adjustable or self-adjusting tuned damper is far more likely to be commercialized. A series of self-adjusting tuned dampers could be produced with a range of weight and tunable frequencies. A user could purchase the self-adjusting tuned damper within their range of interest and simply install the self-adjusting tuned damper. The self-tuning feature of the damper then enables the damper to reach maximum effectiveness without on-site engineering. An increased weight would equate to an increased effectiveness. Therefore, a user could pick a weight class of damper based upon need and allowable weight penalties, and then pick a frequency range. An embodiment damper could then be ordered off-the-shelf, mounted, and immediately put into service. If clock spring designs are used, a single damper device could be field-adjusted to meet a wide range of effective frequencies.

Tuned dampers of the various embodiments may provide multiple benefits, including better performance, lower mass, lower maintenance costs, and lower on-board power requirements than damping devices currently in use. Additionally, tuned dampers of the various embodiments may be applied to vibration isolation systems/mounts. Vibration isolation systems/mounts suspend a vibrating system on a spring-and-damper pad to isolate as much as possible the influence of the vibrating system upon surrounding structures. An example of an isolation system/mount is a roof-mounted Heating, Ventilation, and Air Conditioning (HVAC) system. If a typical vibration isolation system/mount is altered to reduce inherent damping, less impulsive force would be transmitted to the surrounding structure. However, the isolated system would then be un-damped and may vibrate violently. Including an embodiment tuned damper attached to this altered isolation system/mount would reduce the vibration of the HVAC system while still transmitting less force to the roof compared with conventional systems. The various embodiments may also provide tuned dampers to reduce vehicle vibration by putting the engine (or other vibration causing systems) on un-damped isolation mounts using the embodiment tuned dampers. The various embodiments may be applied to sky scrapers to dampen vibrations. The various embodiments may be applied to wind turbines to dampen vibrations.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A vibration damper, comprising:
   a base;
   a slider assembly coupled to the base;
   a housing coupled to the slider assembly, wherein lateral movement of the slider assembly moves the housing;
   a shaft supported in the housing;
   a rotary damper coupled to the shaft;
   a flywheel coupled to the shaft, wherein the flywheel is adjustable to change a mass moment of inertia of the flywheel thereby resulting in a change of the natural frequency of the vibration damper; and
   a converter coupled to the shaft and configured to convert linear motion of the housing into rotational motion of the shaft, the rotary damper, and the flywheel.

2. The vibration damper of claim 1, wherein the rotary damper includes a fluid-filled or viscous rotary damper and the converter includes a spur gear and a rack gear, the spur gear coupled to the shaft, and the rack gear coupled to the base and engaged with the spur gear.

3. The vibration damper of claim 1, wherein the rotary damper is coupled to one end of the shaft and the flywheel is coupled to the shaft at an opposite end from the rotary damper.

4. The vibration damper of claim 1, wherein the flywheel comprises one or more adjustable ballast weights.

5. The vibration damper of claim 4, wherein the flywheel comprises an adjustable ballast weight assembly.

6. The vibration damper of claim 5, wherein the adjustable ballast weight assembly comprises a scissor arm, a gear activated pivoting arm, or a jackscrew.

7. The vibration damper of claim 5, wherein the adjustable ballast weight assembly comprises two scissor arms each coupled to at least one of the one or more adjustable ballast weights.

8. The vibration damper of claim 5, wherein the adjustable ballast weight assembly comprises a swashplate, the vibration damper further comprising:

an actuator coupled to the swashplate, the actuator configured to extend or retract the one or more adjustable ballast weights by movement of the swashplate.

9. The vibration damper of claim 1, wherein the converter comprises a rack gear and a spur gear.

10. The vibration damper of claim 1, further comprising:
one or more rotary springs coupled to the shaft such that the one or more springs oppose rotation of the shaft.

11. A vibration damper system for damping vibrations of a structure, the system comprising:
a base configured to couple to the structure;
a slider assembly coupled to the base;
a housing coupled to the slider assembly, wherein movement of the slider assembly moves the housing;
a shaft rotatably supported in the housing;
a rotary damper coupled to the shaft;
a flywheel coupled to the shaft, wherein the flywheel is adjustable to change a mass moment of inertia of the flywheel and thereby change the natural frequency of the vibration damper system; and
a converter coupled to the shaft and configured to convert linear motion of the housing into rotational motion of the shaft, the rotary, damper, and the flywheel.

12. The system of claim 11, wherein the rotary damper includes a fluid-filled or viscous rotary damper and the converter includes a spur gear and a rack gear, the spur gear coupled to the shaft, and the rack gear coupled to the base and engaged with the spur gear.

13. The system of claim 11, wherein the rotary damper is coupled to one end of the shaft and the flywheel is coupled to the shaft at an opposite end from the rotary damper.

14. The system of claim 11, wherein the flywheel comprises one or more adjustable ballast weights.

15. The system of claim 14, wherein the flywheel comprises an adjustable ballast weight assembly.

16. The system of claim 15, wherein the adjustable ballast weight assembly comprises a scissor arm, a gear activated pivoting arm, or a jackscrew.

17. The system of claim 15, wherein the adjustable ballast weight assembly comprises two scissor arms each coupled to at least one of one or more adjustable ballast weights.

18. The system of claim 15, wherein the adjustable ballast weight assembly comprises a swashplate, and the vibration damper system further comprises:
an actuator coupled to the swashplate, the actuator configured to extend or retract the one or more adjustable ballast weights by movement of the swashplate.

19. The system of claim 11, wherein the converter comprises a rack gear and a spur gear.

20. The system of claim 11, further comprising:
one or more rotary springs coupled to the shaft such that the one or more springs oppose rotation of the shaft.

* * * * *

UNITED STATES PATENT AND TRADEMARK OFFICE
CERTIFICATE OF CORRECTION

| | | |
|---|---|---|
| PATENT NO. | : 10,619,699 B2 | Page 1 of 1 |
| APPLICATION NO. | : 15/959962 | |
| DATED | : April 14, 2020 | |
| INVENTOR(S) | : Thomas G. Ivanco | |

It is certified that error appears in the above-identified patent and that said Letters Patent is hereby corrected as shown below:

On the Title Page

Item (54) and in the Specification, Column 1, Lines 1-2, Title, change "SELF-TURNING" to --SELF-TUNING--

Signed and Sealed this
Eleventh Day of February, 2025

Coke Morgan Stewart
*Acting Director of the United States Patent and Trademark Office*